United States Patent Office 3,401,093
Patented Sept. 10, 1968

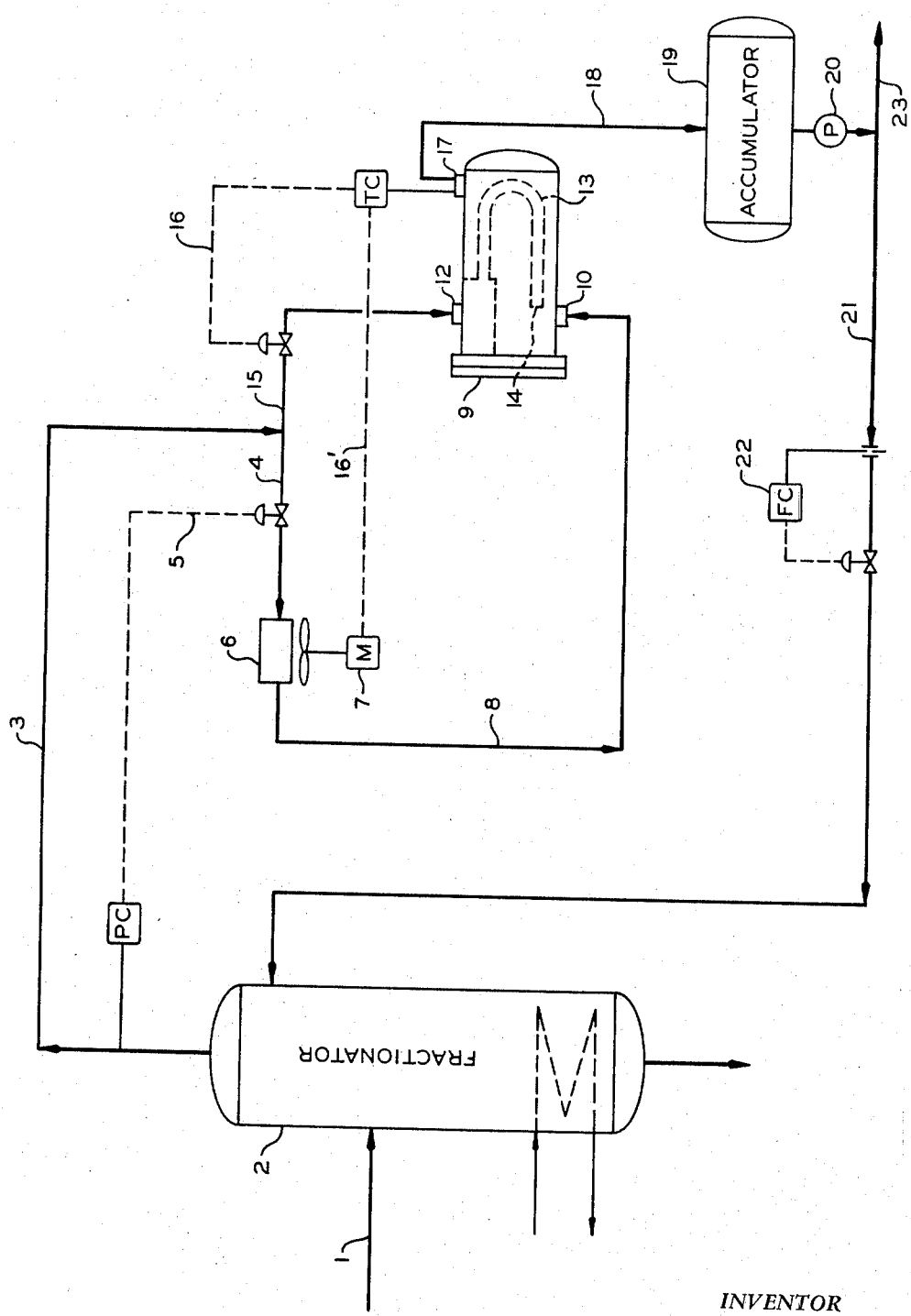

3,401,093
VAPOR LIQUID MIXING IN FRACTIONATION OVERHEAD SYSTEM
Clyde M. Cox, Bartlesville, Okla., assignor to Phillips Petroleum Company, a corporation of Delaware
Filed Oct. 21, 1965, Ser. No. 499,775
6 Claims. (Cl. 203—2)

This invention relates to the mixing of vapors and liquids in the reflux cycle of fractional distillation systems.

Mixing of vapors and liquid in order to obtain a desired temperature of the accumulated volume of resultant liquid in a fractionation overhead accumulator is known. However, such mixing often results in a "water hammer" effect or hydraulic shock. Hydraulic shock is a phenomenon which occurs when vapor, which is warm, comes in contact with a sub-cooled liquid and a vacuum is formed due to the quick collapse of the vapor condensing into liquid. The vacuum is filled by an onrush of liquid. The resulting hammer causes a pressure surge to pass through the system which often causes mechanical difficulties. Other difficulties arise with respect to maintaining a precise temperature of the accumulated liquid volume due to the lag caused by the volume of liquid in the accumulator.

This invention provides a way of mixing hot vapors and sub-cooled liquids in such a manner as to eliminate hydraulic shock and provide precise temperature control of the accumulated liquid. As used herein, sub-cooling means that the liquid is cooled below the final blend temperature. In one embodiment, hot vapor and sub-cooled liquid are passed in indirect-direct heat exchange. As the warm vapor cools due to the indirect heat exchange, it begins to condense. At the same time the cool liquid becomes warmer. The at least partially condensed vapor is mixed with the warmed liquid and the resulting mixture is passed to the accumulator. By utilizing this method of mixing, the hammer effect is eliminated. In order to provide the above-described temperature modification and mixing of vapor and liquid, a shell and tube heat exchanger is modified so that the hot vapor passes in indirect heat exchange with the liquid in the exchanger, is slowly cooled and at least partially condensed, and is then discharged into the warmed liquid in the exchanger. Excellent temperature control of the accumulated liquid is also provided by this invention because the temperature can be controlled at the heat exchanger outlet instead of the accumulator itself.

This invention is applied to a fractionator column overhead vapor condensing system to maintain a constant reflux temperature in the accumulator. The major portion of the overhead vapor stream is cooled and condensed gradually to below the final desired blend temperature. The remaining portion of the overhead vapor is passed to the modified shell and tube heat exchanger. The sub-cooled condensate and hot vapors are indirectly heat exchanged to decrease the differential temperature therebetween, and then blended. A temperature sensitive device senses the temperatature of the outlet stream to the accumulator. If the outlet temperature is too low the proportion of vapor to condensate is increased, thereby raising the temperature of the outlet flow. The small volume of liquid in the exchanger provides fast response to temperature changes. By maintaining a constant reflux temperature, the reflux rate to the fractionator is more constant, thus reducing the number of disturbances in the column caused by temperature variations. The constant reflux rate reduces the tower load and minimizes utility requirements.

An object of this invention is to provide an improved method of mixing vapors and liquids whereby the "hammer effect" or hydraulic shock is eliminated in a fractionation reflux system. Another object is to provide an improved method of accumulating fractionation overhead vapor condensate at a desired temperature. Another object is to provide an improved method of controlling the reflux cycle of a fractional distillation system. Other objects and advantages will become apparent from the following detailed description, taken in connection with the accompanying drawing which illustrates a specific embodiment of this invention.

Feedstock is introduced into a fractionator 2 through a conduit 1. Overhead vapors are removed through a conduit 3. A portion of these overhead vapors is passed through a conduit 4 having a pressure control valve assembly 5 therein, which is responsive to the pressure in fractionator 2. This overhead vapor is then passed through a condenser 6, and the sub-cooled condensate passes through a conduit 8 to the modified shell and tube heat exchanger 9. The sub-cooled condensate enters the shell side at inlet 10. The remaining portion of the hot overhead vapor stream passes through a conduit 15, which has therein a temperature control valve assembly 16, which is responsive to the temperature of the outlet stream from exchanger 9. This vapor enters the heat exchanger at inlet 12 and passes via tube 13 in indirect heat exchange with the condensate and resulting mixture. The vapor at least partially condenses in tube 13 and mixes with the condensate stream at tube outlet 14. The resultant liquid passes through an outlet 17 and a conduit 18 to an accumulator 19. If the outlet temperature of the resultant liquid is below the desired temperature, temperature control valve assembly 16 increases the flow of vapor to heat exchanger 9. Conversely, the flow of vapor is decreased if the outlet temperature falls below its desired value. As an alternative, or as an additional control, an air fin cooler unit 7 can be adjusted in speed, or louvers can be opened and closed, by a temperature control system 16' in order to maintain a desired temperature of the mixture. A portion of the resultant liquid is passed from the accumulator by pump 20 through a reflux conduit 21, which has a flow controller assembly 22 therein, back into fractionator 2 as reflux. The remainder is removed as overhead product through conduit 23.

As a specific example of the operation of this invention, fractionator 2 is employed as a deisopentanizer. The following are typical operating conditions:

Fractionator 2

| | |
|---|---:|
| Pressure (p.s.i.g.) | 49 |
| Temperature (° F.): | |
| Top | 175 |
| Bottom | 219 |
| Feed 1 (barrels/day), composition | 9,128 |
| Isopentane and lighter (vol. percent) | 52 |
| n-Pentane and heavier (vol. percent) | 48 |
| Overhead vapor 3 (barrels/day, measured as liquid), composition | [1] 39,912 |
| Isopentane and lighter (vol. percent) | 95 |
| n-Pentane and heavier (vol. percent) | 5 |

[1] Includes 35,500 barrels/day external reflux.

Cooler 6

| | |
|---|---:|
| Vapor feed 4 (barrels/day, measured as liquid) | 36,280 |
| Temperature (° F.) | 175 |
| Liquid product 8 (barrels/day) | 36,280 |
| Temperature (° F.) | 100 |

Exchanger 9

| | |
|---|---|
| Liquid feed 8 (barrels/day) | 36,280 |
| Temperature (° F.) | 100 |
| Vapor feed 15 (barrels/day, measured as liquid) | 3,632 |
| Temperature (° F.) | 175 |
| Product liquid 18 (barrels/day) | 39,912 |
| Temperature (° F.) | 140 |

While this invention has been described in conjunction with a presently preferred embodiment, it obviously is not limited thereto.

What is claimed is:

1. A method of handling overhead vapors from a fractionation column which comprises:
   dividing the overhead vapors from a fractionation column into first and second streams,
   cooling said first stream to condense vapor therein,
   passing the vapors in said second stream in indirect heat exchange relationship with the mixture obtained by the following step,
   mixing the condensed vapors in the first stream with the fluid in the second stream after the foregoing heat exchange step,
   passing a portion of the resulting mixture to the upper region of the fractionation column as external reflux, and
   removing the remainder of the resulting mixture as overhead product.

2. The method of claim 1, further comprising measuring the temperature of said mixture and regulating the relative flows of said first and second streams so as to maintain the measured temperature constant.

3. The method of claim 1, further comprising measuring the temperature of said mixture and regulating the amount that said first stream is cooled so as to maintain the measured temperature constant.

4. In a fractionation system that includes a fractionation column, means to condense overhead vapor, an accumulator to receive condensed vapor, and means to return condensate from the accumulator to the column as reflux; improved apparatus for condensing the vapor comprising:
   a vessel having an inlet and an outlet spaced from one another,
   a tube positioned within said vessel so that fluid passing through said tube is in indirect heat exchange relationship with fluid in said vessel, the inlet of said tube being external of said vessel, and the outlet of said tube being inside said vessel adjacent the inlet of said vessel,
   first conduit means communicating between the top of said fractionation column and the inlet of said vessel,
   cooling means associated with said first conduit means to condense vapors in said first conduit means,
   second conduit means communicating between the top of said fractionation column and the inlet of said tube, and
   third conduit means communicating between the outlet of said vessel and said accumulator.

5. The apparatus of claim 4, further comprising temperature sensing means positioned to sense the temperature of fluid removed from said outlet of said vessel, and means responsive to said temperature sensing means to regulate the relative flows through said first and second conduit means.

6. The apparatus of claim 4, further comprising temperature sensing means positioned to sense the temperature of fluid removed from said outlet of said vessel, and means responsive to said temperature sensing means to regulate said cooling means.

References Cited
UNITED STATES PATENTS

| | | | |
|---|---|---|---|
| 1,778,921 | 10/1930 | Swartz et al. | 165—139 |
| 1,829,846 | 11/1931 | Armacost | 165—110 |
| 2,711,992 | 6/1955 | Kerner | 203—2 |
| 2,915,462 | 12/1959 | Salmon | 203—2 |
| 3,039,941 | 6/1962 | Sweeney et al. | 203—2 |
| 3,101,595 | 8/1963 | Peters et al. | 165—110 |
| 3,318,373 | 5/1967 | Church | 165—110 |
| 3,320,159 | 5/1967 | Potts | 203—87 |

WILBUR L. BASCOMB, JR., *Primary Examiner.*